(12) United States Patent
Krishna et al.

(10) Patent No.: US 10,697,699 B2
(45) Date of Patent: Jun. 30, 2020

(54) CABINET ASSEMBLY OF AN APPLIANCE

(71) Applicant: WHIRLPOOL CORPORATION, Benton Harbor, MI (US)

(72) Inventors: Sai B. Krishna, Pune (IN); Abhay Naik, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 16/180,948

(22) Filed: Nov. 5, 2018

(65) Prior Publication Data

US 2020/0141628 A1 May 7, 2020

(51) Int. Cl.
*F25D 23/06* (2006.01)
*F25D 23/08* (2006.01)

(52) U.S. Cl.
CPC ......... *F25D 23/067* (2013.01); *F25D 23/062* (2013.01); *F25D 23/066* (2013.01); *F25D 23/085* (2013.01); *F25D 23/087* (2013.01); *F25D 2201/14* (2013.01)

(58) Field of Classification Search
CPC .... F25D 23/067; F25D 23/066; F25D 23/087; F25D 23/062; F25D 23/085; F25D 2201/14
See application file for complete search history.

(56) References Cited

U.S. PATENT DOCUMENTS

| 2,329,647 | A |   | 9/1943  | Philipp |             |
|-----------|---|---|---------|---------|-------------|
| 2,644,605 | A | * | 7/1953  | Palmer  | F25D 23/085 |
|           |   |   |         |         | 220/592.06  |
| 2,648,584 | A |   | 8/1953  | Morton  |             |
| 2,789,720 | A |   | 4/1957  | Palmer  |             |
| 2,809,764 | A | * | 10/1957 | Diamond | F25D 23/085 |
|           |   |   |         |         | 220/592.06  |
| 2,855,636 | A | * | 10/1958 | Donnelly| F25D 23/085 |
|           |   |   |         |         | 52/792.1    |
| 3,165,221 | A | * | 1/1965  | Kasady  | F25D 23/064 |
|           |   |   |         |         | 220/592.06  |
| 3,632,012 | A | * | 1/1972  | Kitson  | F25D 23/064 |
|           |   |   |         |         | 220/592.06  |
| 3,633,783 | A | * | 1/1972  | Aue     | F25D 23/085 |
|           |   |   |         |         | 220/592.06  |
| 4,378,137 | A | * | 3/1983  | Gibson  | A47B 87/02  |
|           |   |   |         |         | 312/108     |
| 4,732,432 | A | * | 3/1988  | Keil    | F25D 23/082 |
|           |   |   |         |         | 220/592.06  |
| 4,870,735 | A | * | 10/1989 | Jahr, Jr.| B29C 44/18 |
|           |   |   |         |         | 29/890.035  |
| 5,720,536 | A | * | 2/1998  | Jenkins | F25D 23/085 |
|           |   |   |         |         | 312/401     |

(Continued)

FOREIGN PATENT DOCUMENTS

| EP | 3410049 A2 * | 12/2018 | ............. A47F 1/00 |
| WO | WO-2017192121 A1 * | 11/2017 | .......... F25D 23/028 |

(Continued)

*Primary Examiner* — Hanh V Tran
(74) *Attorney, Agent, or Firm* — Price Heneveld LLP

(57) ABSTRACT

A cabinet for an appliance, such as a refrigerated appliance, includes a cabinet wrapper, a trim breaker operably coupled to the cabinet wrapper and defining an interface, and load transfer bracket operably coupled to the interface. Structural loading stresses are transferred to the load transfer bracket at the interface.

17 Claims, 4 Drawing Sheets

(56) References Cited

U.S. PATENT DOCUMENTS

| | | | | |
|---|---|---|---|---|
| 6,485,122 | B2* | 11/2002 | Wolf | F25D 23/062 |
| | | | | 220/592.06 |
| 6,655,766 | B2 | 12/2003 | Hodges | |
| 8,752,921 | B2* | 6/2014 | Gorz | F25D 23/062 |
| | | | | 312/406.2 |
| 8,943,770 | B2 | 2/2015 | Sanders et al. | |
| 9,062,480 | B2* | 6/2015 | Litch | F25D 23/087 |
| 9,170,046 | B2 | 10/2015 | Jung et al. | |
| 2011/0146336 | A1* | 6/2011 | Selin | F25D 23/063 |
| | | | | 62/449 |
| 2012/0104923 | A1* | 5/2012 | Jung | F25D 23/066 |
| | | | | 312/406 |
| 2016/0258671 | A1* | 9/2016 | Allard | F25D 23/065 |
| 2017/0292776 | A1* | 10/2017 | Kim | F25D 21/04 |
| 2017/0325634 | A1* | 11/2017 | Cai | A47J 41/0038 |
| 2018/0180350 | A1* | 6/2018 | Yoon | F25D 23/066 |
| 2018/0187957 | A1* | 7/2018 | Jung | F25D 23/062 |
| 2018/0311884 | A1* | 11/2018 | Allard | B65D 81/3823 |
| 2018/0347871 | A1* | 12/2018 | Park | F25B 21/04 |
| 2019/0128593 | A1* | 5/2019 | Deka | F16L 59/065 |
| 2019/0170431 | A1* | 6/2019 | Naik | F25D 23/085 |

FOREIGN PATENT DOCUMENTS

| | | | | |
|---|---|---|---|---|
| WO | 2018022007 | A1 | 2/2018 | |
| WO | WO-2018022009 | A1* | 2/2018 | F25D 23/085 |
| WO | WO-2018067108 | A1* | 4/2018 | F25D 23/082 |
| WO | WO-2018151705 | A1* | 8/2018 | F16B 11/006 |
| WO | WO-2019108204 | A1* | 6/2019 | F25D 21/04 |

\* cited by examiner

CABINET ASSEMBLY OF AN APPLIANCE

FIELD OF THE DISCLOSURE

The present disclosure generally relates to a cabinet assembly of an appliance. More specifically, the present disclosure generally relates to a cabinet assembly of an insulated appliance.

BACKGROUND

Appliances, such as refrigerated appliances, can include a cabinet wrapper and a liner. A trim breaker can be coupled with the metal cabinet wrapper and the liner.

SUMMARY

According to a first aspect of the present disclosure, a cabinet for a refrigerating appliance includes a metal cabinet wrapper, a liner disposed within the metal cabinet wrapper, a plastic trim breaker including a plurality of spaced flanges operably coupled to the metal cabinet wrapper and defining an interface, and a load transfer bracket assembly including a plurality of spaced load transfer brackets operably coupled to the metal cabinet wrapper and to the plastic trim breaker. Each of the plurality of load transfer brackets align with each of the plurality of flanges and structural loading stresses are transferred to the load transfer bracket assembly at the interface upon exposure of a gap between the metal cabinet wrapper and liner to a vacuum.

According to a second aspect of the present disclosure, a cabinet for an appliance includes a metal cabinet wrapper, a plastic trim breaker operably coupled to the metal cabinet wrapper and defining an interface, and a load transfer bracket assembly operably coupled to the interface. Structural loading stresses are transferred to the load transfer bracket assembly at the interface to maintain the position of the metal cabinet wrapper with respect to the plastic trim breaker thereby reducing the loading stresses on an adhesive at the interface.

According to a third aspect of the present disclosure, a cabinet for an appliance includes a cabinet wrapper, a trim breaker operably coupled to the cabinet wrapper and defining an interface, and a load transfer bracket operably coupled to the interface. Structural loading stresses are transferred to the load transfer bracket at the interface.

These and other aspects, objects, and features of the present disclosure will be understood and appreciated by those skilled in the art upon studying the following specification, claims, and appended drawings.

DETAILED DESCRIPTION

Figure 1:
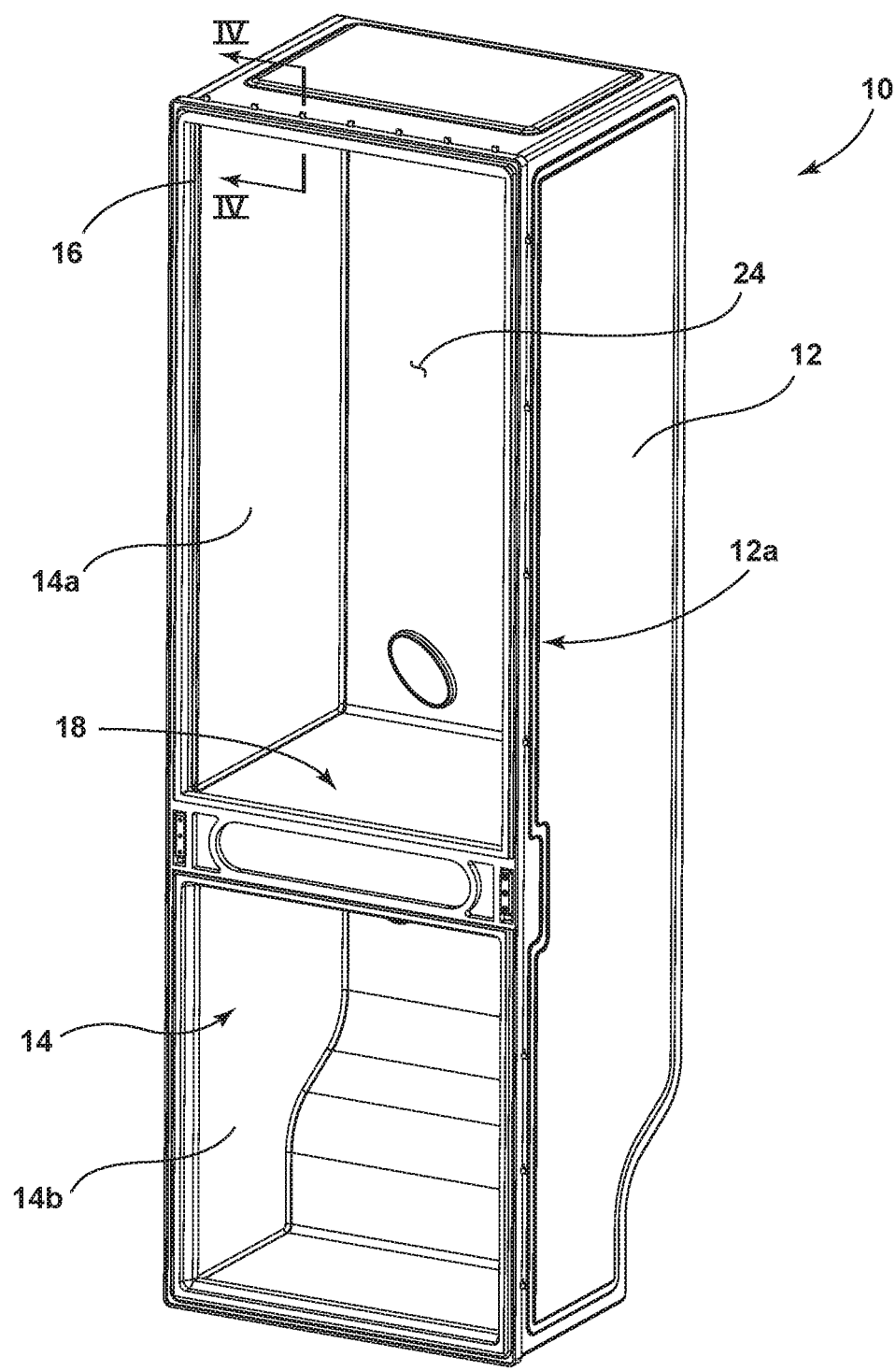
FIG. 1 is a front perspective view of a refrigerator cabinet according to aspects of the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a cabinet assembly of an appliance. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-4, a cabinet 10 for an appliance includes a cabinet wrapper 12, a trim breaker 16 operably coupled to the cabinet wrapper 12 and defining an interface 40 and a load transfer bracket 30 operably coupled to the interface 40, wherein structural loading stresses are transferred to the load transfer bracket 30 at the interface 40.

Referring now to FIG. 1, a cabinet assembly for an appliance, or cabinet 10 is provided in an exemplary form that includes a cabinet wrapper 12 and a liner 14 according to some aspects. In some examples, the cabinet 10 may be configured as a cabinet 10 for use in a built-in appliance, such as a built-in refrigerator. The cabinet wrapper 12 can be made of a metallic material, (e.g., aluminum, steel, etc.), and can include an edge, or periphery 12a that defines an interior 24. As shown, the liner 14 can be disposed or mounted within the cabinet wrapper 12, further defining the interior 24 of the cabinet 10. Typically, the liner 14 is attached, coupled, joined, or otherwise fastened to the cabinet wrapper 12 via an adhesive, insulating foam, bonding agent, mechanical fastener (e.g., rivets, screws, etc.), or another comparable approach. In some examples, the liner 14 can include a partition 18 that divides the liner 14 into an upper portion 14a and a lower portion 14b. The upper portion 14a can define a refrigerated storage space, while the lower portion 14b can define a freezer storage space. A trim breaker 16 can couple the cabinet wrapper 12 and the liner 14 at the periphery 12a. The trim breaker 16 can be made of polymers, plastics, or other like materials. It may be beneficial for the trim breaker 16 to be made of a material that has at least some insulative properties. Additionally, it may be beneficial for the trim breaker 16 to be made from a resilient of pliable material.

The trim breaker 16 can be dimensioned to cover the entire periphery 12a of the cabinet wrapper 12 and form a seal between the cabinet wrapper 12 and the liner 14 to form an insulation structure, which can be substantially air-tight. In some examples, a space or gap between the cabinet wrapper 12 and the liner 14 can be evacuated such that a pressure within the space or gap between the cabinet wrapper 12 and the liner 14 is less than a pressure outside of the cabinet 10 and/or within the interior 24 and the trim breaker 16. The space or gap can be evacuated until a pressure of about 1 mbar (0.1 kPa) is reached. Accordingly, in such examples, the insulation structure may be referred to as a vacuum-insulated structure. The term vacuum-insulated structure is not intended to refer to an absolute vacuum. Rather, the term vacuum-insulated structure is intended to refer to a structure that has an internal pressure that is below atmospheric pressure. For example, the space or gap between the cabinet wrapper 12 and the liner 14 may be less than about 50 kPa, less than about 20 kPa, less than about 5 kPa, greater than 0 kPa and/or combinations of ranges thereof. In various examples, the space or gap between the cabinet wrapper 12 and the liner 14 may be additionally or alternatively filled with an insulative material (e.g. foam, beads, etc.) prior to the evacuation of the space or gap. Stated another way, the vacuum-insulated structure may include an insulative material provided in the space or gap. Alternatively, the space or gap may be filled with the insulative material rather than evacuating the space or gap.

Figure 2:
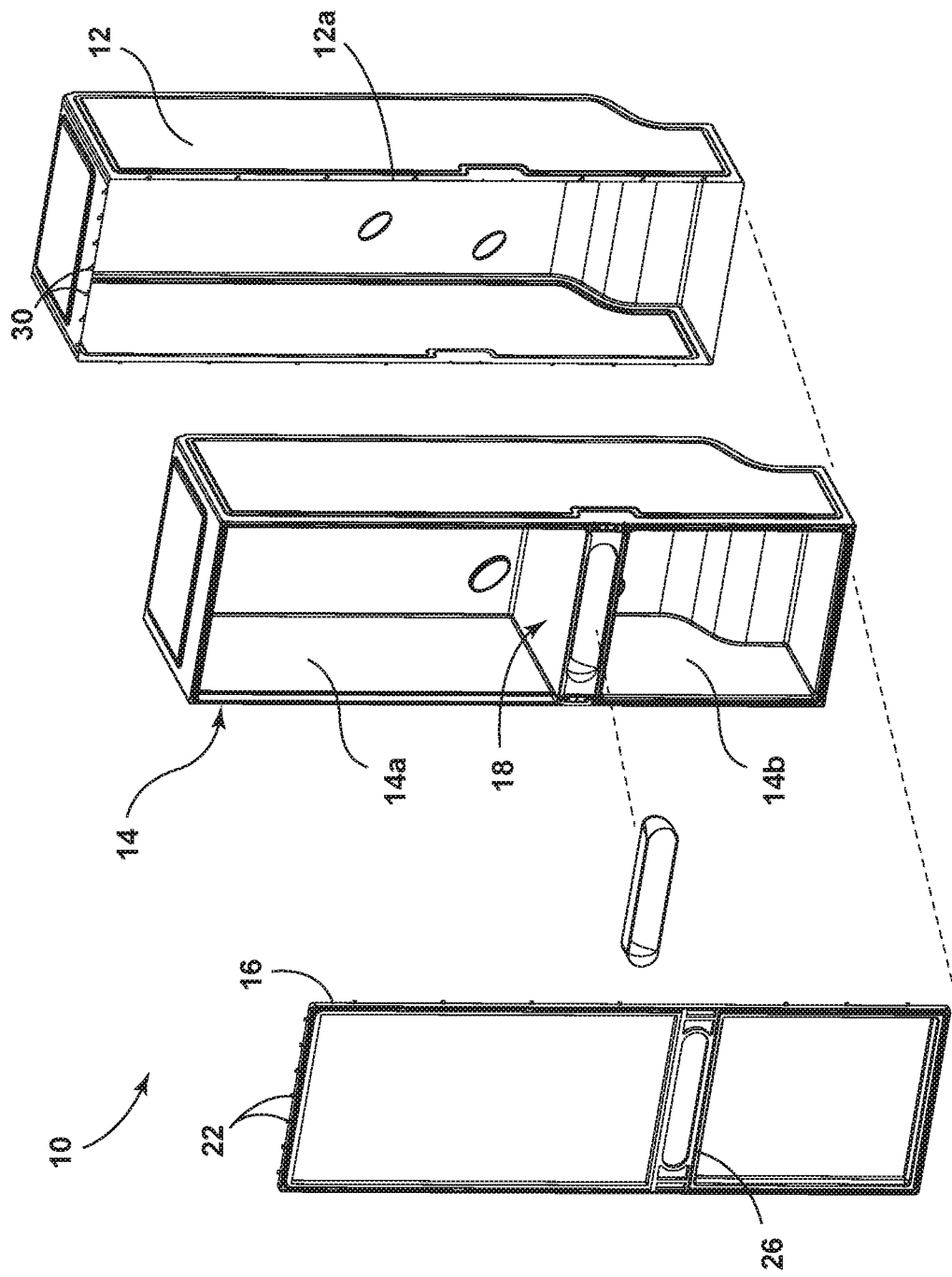
FIG. 2 is an exploded view of the refrigerator cabinet, according to aspects of the present disclosure.

FIG. 2 is an exploded view of the cabinet of FIG. 1 more clearly illustrating the components of the cabinet 10. The trim breaker 16 can include a partition portion 26 that aligns with the partition 18 on the liner 14 such that the insulation structure can extend between the upper portion 14a and lower portion 14b of the liner 14. The cabinet wrapper 12 can include a load transfer bracket assembly that can include a plurality of load transfer brackets 30 operably coupled to the cabinet wrapper 12. The load transfer brackets 30 can be spaced along the periphery 12a. In some examples, the load transfer brackets 30 can be equidistantly spaced along at least one side of the cabinet 10. Furthermore, at least one load transfer bracket 30 can be coupled to at least two sides of the cabinet 10. The trim breaker 16 can include a plurality of flanges 22 operably coupled to the cabinet wrapper 12. In some examples the flanges 22 can be formed on the trim breaker 16 and spaced such that each flange 22 is configured to align with a corresponding load transfer bracket 30 on the cabinet wrapper 12. While multiple flanges 22 and load transfer brackets 30 are illustrated in FIG. 2, it is possible that the cabinet 10 includes a single corresponding pair of the flange 22 and the load transfer bracket 30.

Figure 3:
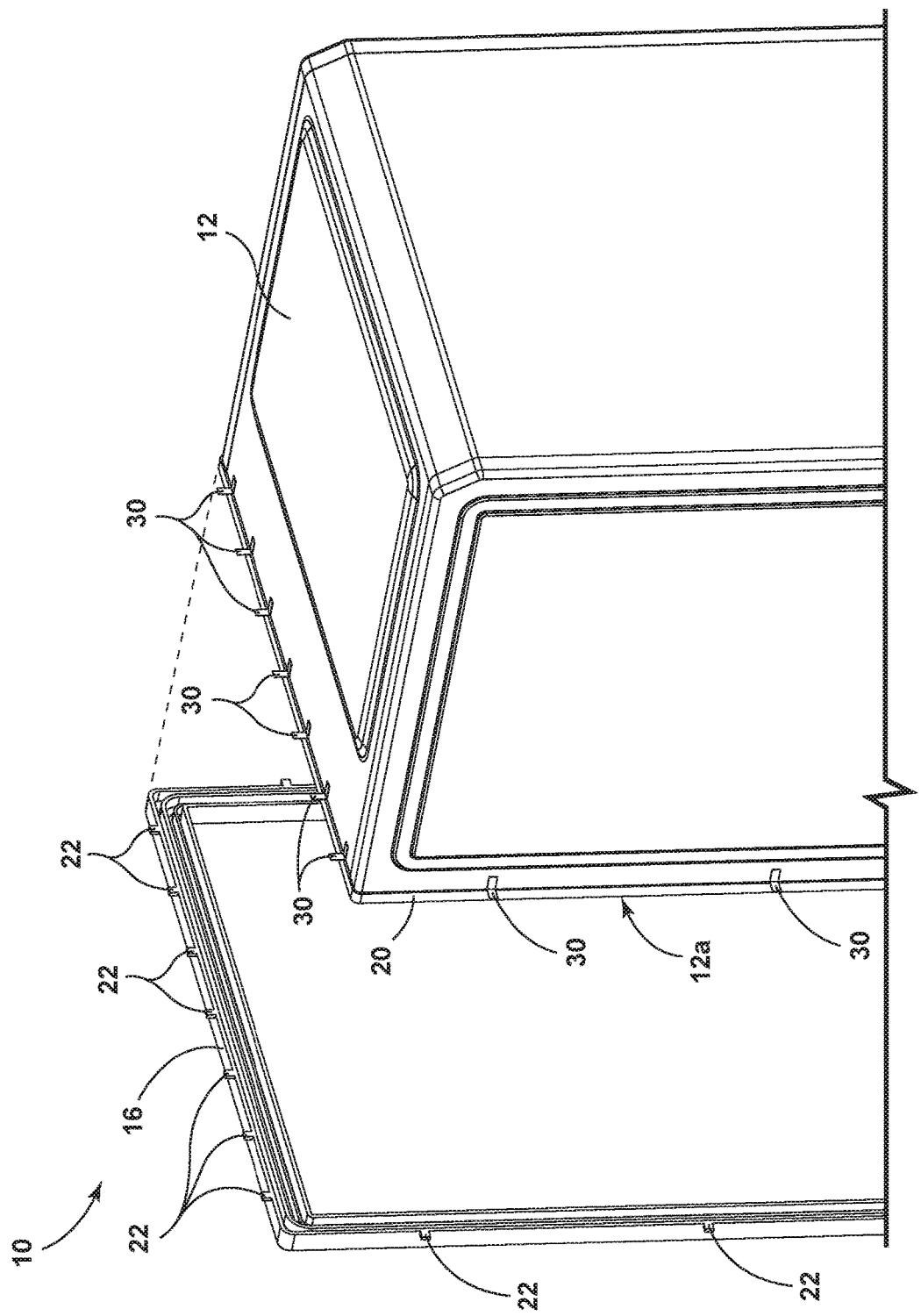
FIG. 3 is a rear perspective view of a portion of the refrigerator cabinet, further illustrating a plastic trim breaker prior to installation according to aspects of the present disclosure.

Turning to FIG. 3, a rear perspective view of a portion of the cabinet 10 further illustrates the trim breaker 16. The liner 14 (see FIG. 1) is mounted within the cabinet wrapper 12. The load transfer brackets 30 can be in the form of an L-shaped bracket where a portion of the load transfer bracket 30 can be welded to the cabinet wrapper 12. However, any other suitable method can be utilized to couple the load transfer brackets 30 to the cabinet wrapper 12, which can include integrally formed, utilizing an adhesive, utilizing a bonding agent, and the like. It is also contemplated that the load transfer bracket 30 is in the form of an elongated bracket. Furthermore, the flanges 22 can be formed separately from the trim breaker 16 as opposed to being integral with the trim breaker 16 as illustrated in FIG. 3.

An adhesive 20 can be applied to, and extend about, the periphery 12a of the cabinet wrapper 12 to couple the trim breaker 16 to the cabinet wrapper 12 and liner 14. In one example, the adhesive 20 is positioned in between the trim breaker 16 and the load transfer brackets 30. While FIGS. 2 and 3 illustrate the load transfer brackets 30 mounted to the cabinet wrapper 12 prior to installation of the trim breaker 16, it is contemplated that the trim breaker 16 can be mounted to the cabinet wrapper 12 first, followed by the load transfer brackets 30 being coupled to the cabinet 10.

Figure 4:
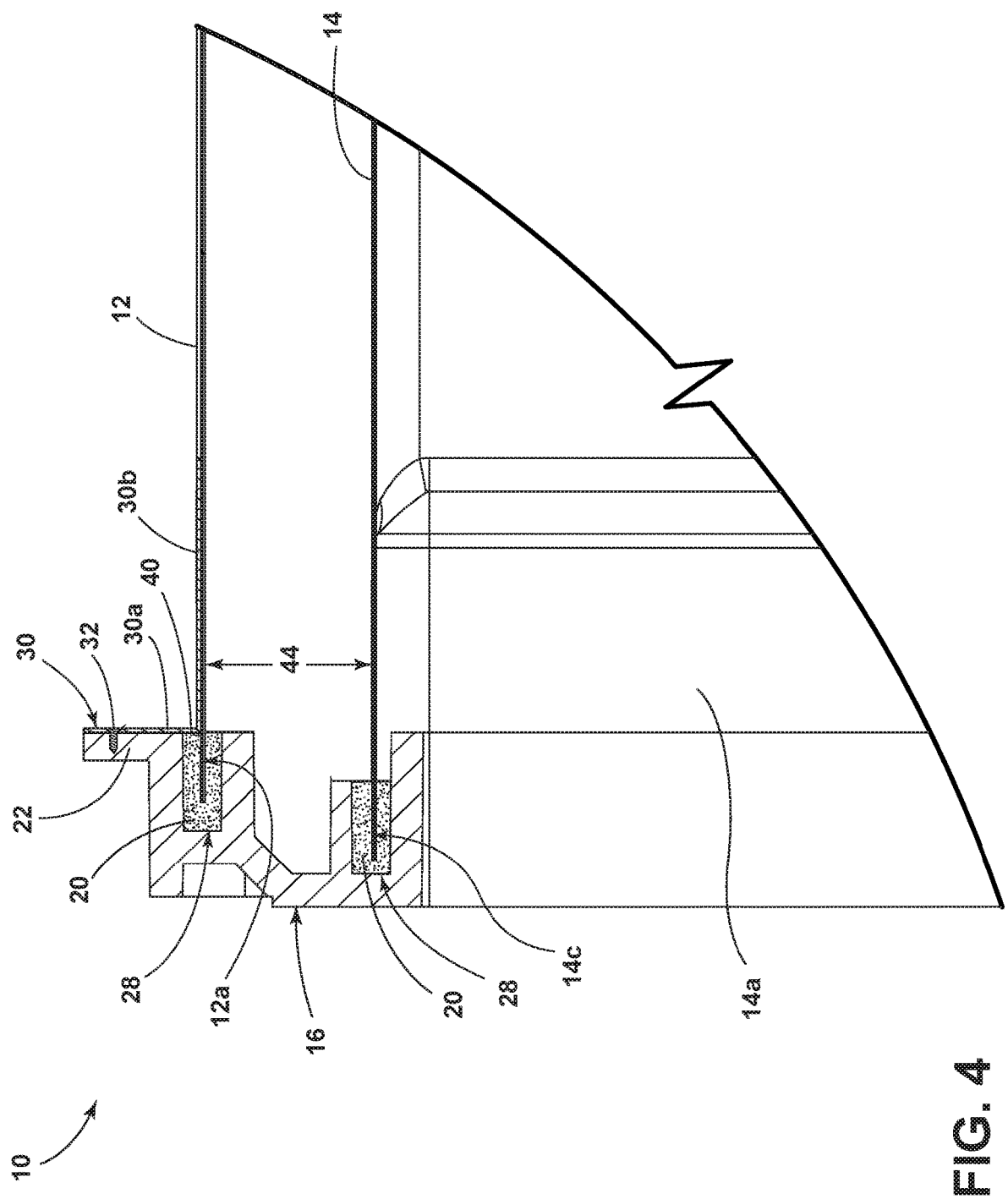
FIG. 4 is a cross-sectional view taken along line IV-IV of FIG. 1, illustrating a metal cabinet wrapper and plastic trim breaker interface, according to aspects of the present disclosure.

FIG. 4 is a cross-sectional view taken along line IV-IV of FIG. 1 illustrating an interface 40 defined by a surface of the common boundary of the cabinet wrapper 12 and trim breaker 16. The trim breaker 16 can seal a gap 44, between the cabinet wrapper 12 and the liner 14. An internal pressure of the gap 44 defined between the liner and the metal cabinet wrapper can be approximately 1 Mbar (0.1 kPa). However, the internal pressure of the gap 44 can vary and can be less than or greater than 1 Mbar. The adhesive 20 can be applied to the periphery 12a of the cabinet wrapper 12 and to a periphery 14c of the liner 14 in order to adhere the trim breaker 16 and seal the gap 44. The trim breaker 16 can include recessed portions 28 that are dimensioned to receive the adhesive 20 on the periphery 12a of the cabinet wrapper 12 and the periphery 14c of the liner 14. Alternatively, the adhesive 20 can be applied within the recessed portions 28, as opposed to the periphery 12a and periphery 14c.

The load transfer bracket 30 can include a first end 30a and a second end 30b. In some examples, the first end 30a and the second end 30b can be generally perpendicular with respect to each other. As such, the first end 30a can engage with the interface 40 and the second end 30b can engage with the cabinet wrapper 12. Furthermore, a fastener 32, such as a screw, a bolt, or the like, can be used to mount the first end 30a to the flange 22 on the trim breaker 16. Alternatively, the first end 30a can be adhered to the flange 22 with an adhesive, snap features, or any other suitable coupling method. While the first end 30a can be mounted to the trim breaker 16 via a fastener, the second end 30b requires a mounting method to the cabinet wrapper 12 that will not puncture, or otherwise break the substantially airtight seal between the cabinet wrapper 12 and the liner 14. As discussed above, the second end 30b can be welded or otherwise mounted to the cabinet wrapper 12. The first end 30a can directly contact the adhesive 20 while the second end 30b can directly contact the cabinet wrapper 12.

Benefits of the aspects described herein can include transferring structural loading stresses to the load transfer bracket 30 at the interface 40 of the cabinet wrapper 12 and the trim breaker 16. When a vacuum is applied to the space, illustrated in FIG. 4 as the gap 44, defined between the cabinet wrapper 12 and the liner 14, the adhesive 20 endures loading stresses that can lead to a failure mode, such as a leak. A leak can lead to a loss of insulative properties of the cabinet 10. However, in the case where the load transfer bracket 30 is applied to the interface 40 and a vacuum is exposed to the cabinet wrapper 12 and the trim breaker 16, the load transfer bracket 30 absorbs the loading stresses and reduces the magnitude of loading stresses experienced by the adhesive 20 such that failure modes are avoided. Furthermore, the load transfer bracket 30 can be configured to maintain the position of the cabinet wrapper 12 with respect to the trim breaker 16. Specifically, the load transfer bracket 30 can be configured to maintain a lateral position of the trim breaker 16 upon exposure of the gap 44 between the cabinet wrapper 12 and the liner 14 to a vacuum thereby reducing the loading stresses on the adhesive 20 at the interface 40.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A cabinet for a refrigerating appliance, comprising:
   a metal cabinet wrapper;
   a liner disposed within the metal cabinet wrapper;
   a plastic trim breaker including a plurality of spaced flanges operably coupled to the metal cabinet wrapper and defining an interface; and
   a load transfer bracket assembly including a plurality of spaced load transfer brackets operably coupled to the metal cabinet wrapper and to the plastic trim breaker wherein the load transfer bracket assembly is external to a gap between the metal cabinet wrapper and liner, and wherein each of the plurality of load transfer brackets align with each of the plurality of spaced flanges and structural loading stresses are transferred to the load transfer bracket assembly at the interface upon exposure of the gap to a vacuum.

2. The cabinet for a refrigerating appliance of claim 1, wherein an internal pressure defined between the liner and the metal cabinet wrapper is approximately 0.1 kPa or below.

3. The cabinet for a refrigerating appliance of claim 1, wherein each of the plurality of spaced load transfer brackets is an L-shaped bracket having a first end fastened to the plastic trim breaker and a second end welded to the metal cabinet wrapper.

4. The cabinet for a refrigerating appliance of claim 3, wherein upon exposure of the gap to the vacuum a lateral position of the plastic trim breaker is maintained thereby reducing the structural loading stresses on an adhesive at the interface.

5. The cabinet for a refrigerating appliance of claim 1, wherein the plurality of spaced load transfer brackets are equidistantly spaced along at least one side of the cabinet.

6. The cabinet for a refrigerating appliance of claim 1, wherein the plurality of spaced load transfer brackets are coupled to at least two sides of the cabinet.

7. The cabinet for a refrigerating appliance of claim 1, wherein the plurality of spaced flanges are integral with the plastic trim breaker.

8. A cabinet for an appliance, comprising:
a metal cabinet wrapper;
a plastic trim breaker operably coupled to the metal cabinet wrapper and defining an interface; and
a load transfer bracket assembly operably coupled to the interface, the load transfer bracket assembly including a load transfer bracket that includes an L-shaped bracket having a first end fastened to the plastic trim breaker and a second end welded to the metal cabinet wrapper, wherein structural loading stresses are transferred to the load transfer bracket assembly at the interface to maintain a position of the metal cabinet wrapper with respect to the plastic trim breaker thereby reducing the structural loading stresses on an adhesive at the interface.

9. The cabinet for an appliance of claim 8, wherein the load transfer bracket is integral with the metal cabinet wrapper.

10. The cabinet for an appliance of claim 8, wherein upon exposure to a vacuum a lateral position of the plastic trim breaker is maintained.

11. The cabinet for an appliance of claim 8, wherein said appliance further comprises:
a refrigerating appliance.

12. A cabinet for an appliance, comprising:
a cabinet wrapper;
a trim breaker operably coupled to the cabinet wrapper and defining an interface external to the cabinet wrapper; and
a plurality of load transfer brackets operably coupled to and spaced along the interface, wherein the plurality of load transfer brackets are coupled to at least two sides of the cabinet and structural loading stresses are transferred to the load transfer brackets at the interface.

13. The cabinet for an appliance of claim 12, wherein the plurality of load transfer brackets are L-shaped brackets having a first end fastened to the trim breaker and a second end coupled to the cabinet wrapper.

14. The cabinet for an appliance of claim 12, wherein said appliance further comprises:
a refrigerating appliance.

15. The cabinet for an appliance of claim 12, wherein an internal pressure defined between a liner and the cabinet wrapper is less than atmospheric pressure.

16. The cabinet for an appliance of claim 12, wherein the plurality of load transfer brackets are equidistantly spaced along at least one side of a cabinet.

17. The cabinet for an appliance of claim 12, wherein the plurality of load transfer brackets are integral with the cabinet wrapper.

* * * * *